Nov. 21, 1939.  H. J. KAYE  2,180,740
SELECTOR CONTROL MECHANISM
Filed Oct. 6, 1937  3 Sheets-Sheet 1
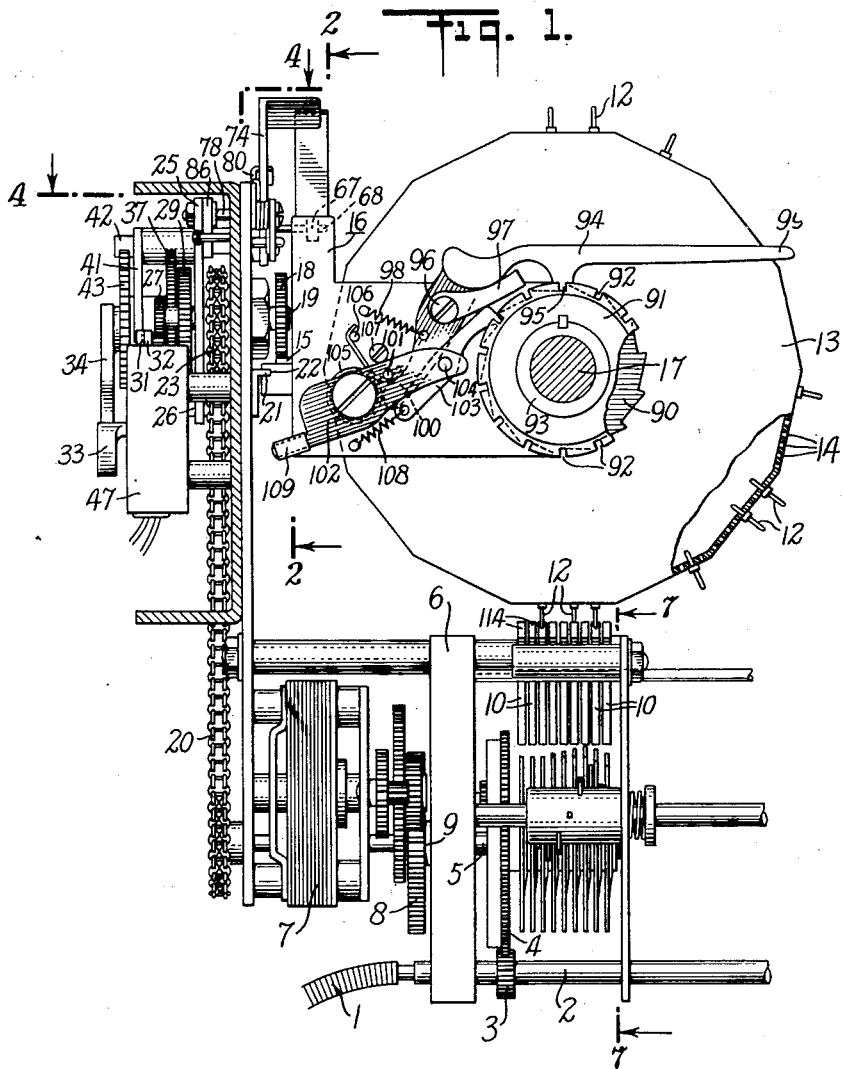
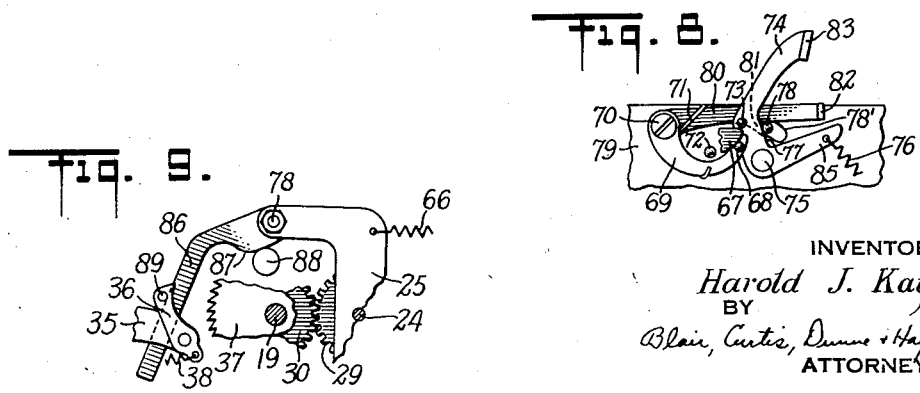
INVENTOR
Harold J. Kaye
BY
Blair, Curtis, Dunne + Hayward
ATTORNEYS

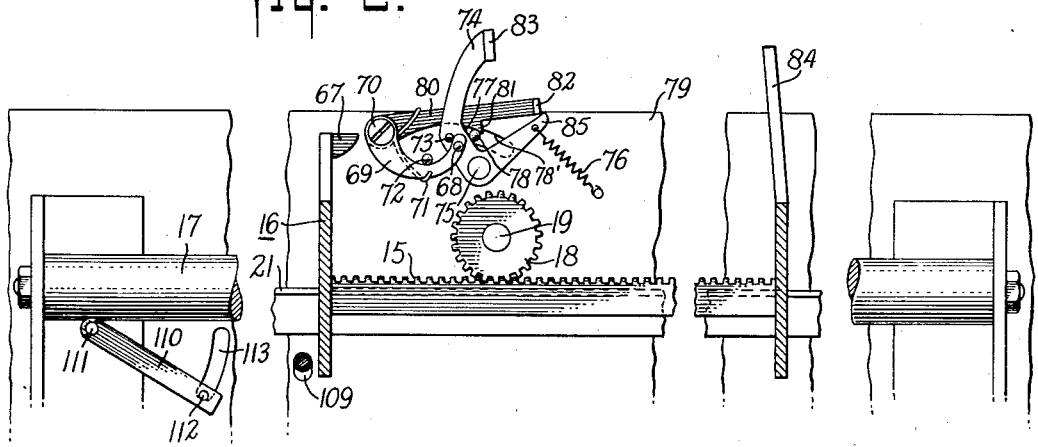
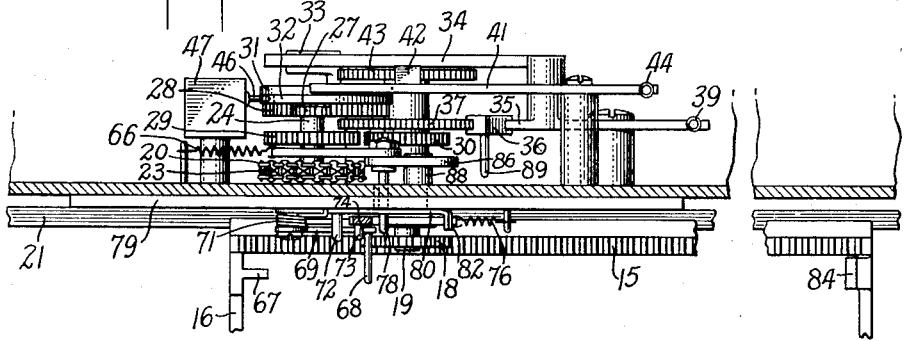
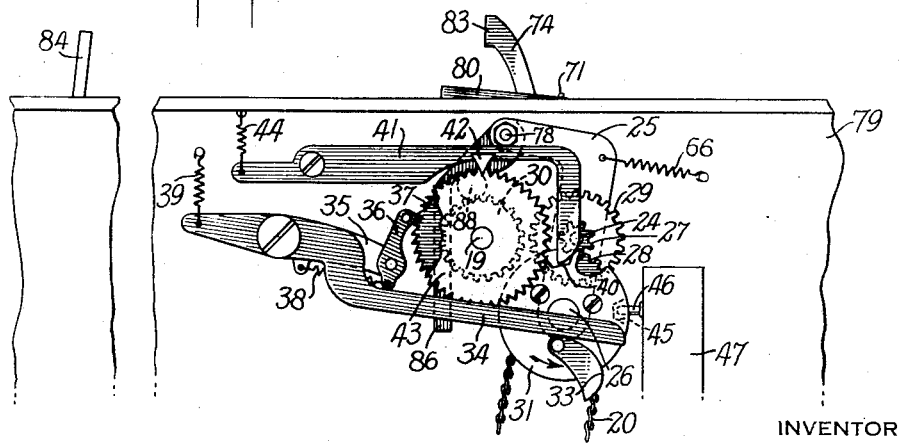

Nov. 21, 1939.  H. J. KAYE  2,180,740
SELECTOR CONTROL MECHANISM
Filed Oct. 6, 1937  3 Sheets-Sheet 3
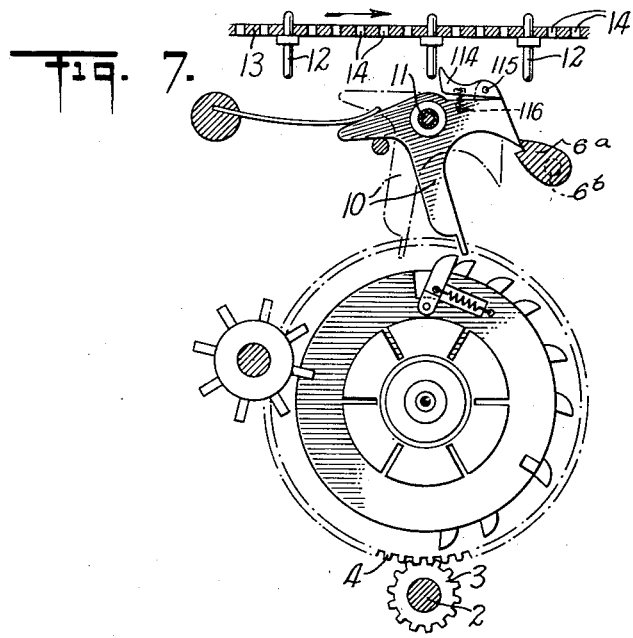
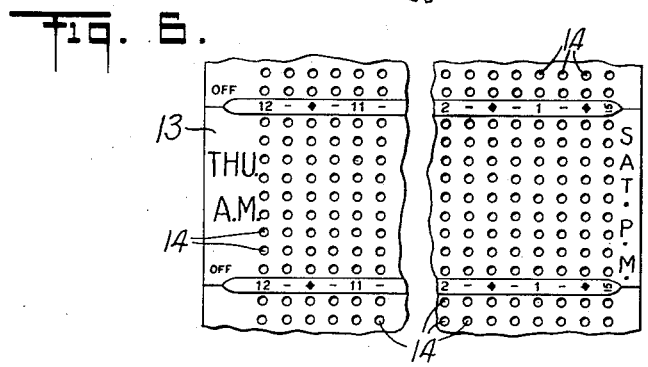
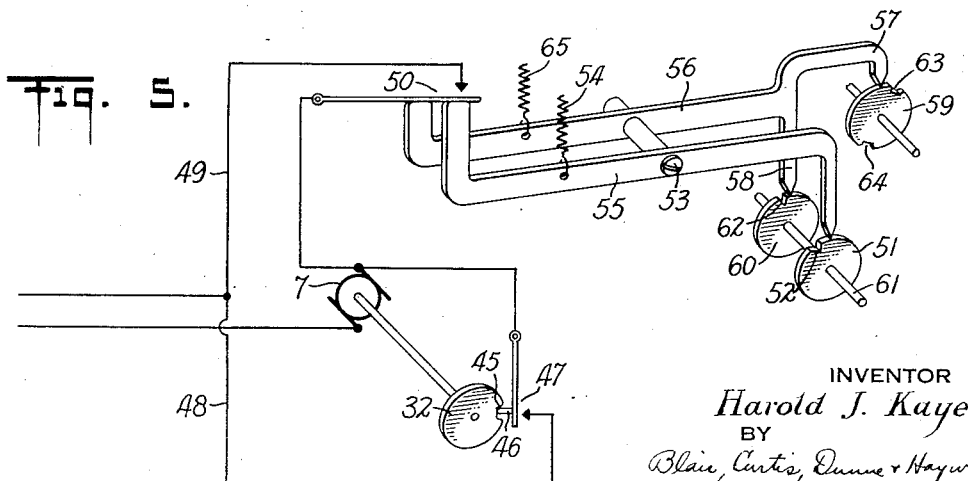
INVENTOR
Harold J. Kaye
BY
Blair, Curtis, Dunne & Hayward
ATTORNEYS

Patented Nov. 21, 1939

2,180,740

UNITED STATES PATENT OFFICE 2,180,740

SELECTOR CONTROL MECHANISM

Harold J. Kaye, New York, N. Y.

Application October 6, 1937, Serial No. 167,584

11 Claims. (Cl. 161—1)

The present invention relates to selector control mechanism of a type which may advantageously be applied to radio receivers without, however, being restricted to that use. As so employed, one object of the invention has been to provide control apparatus whereby tuning in of different stations in any desired predetermined sequence is effected by wholly automatic means. A further object has been to provide means in such apparatus for predetermining and automatically repeating said sequence over any desired or customary period, as a week, which is the usual program time unit in radio broadcasting. The invention is obviously adapted for beneficial use in other fields and for different periods of time and for different cycles of operations either similar or unlike in character.

One embodiment of my invention designed more especially for use in radio reception is described in the following specification and illustrated in the accompanying drawings wherein—

Figure 1 is an end elevation;

Figure 2, a view with portions in vertical section on the line 2—2 of Figure 1;

Figure 3, a rear elevation of upper parts of the apparatus shown in Figure 1;

Figure 4, a top plan view with portions in horizontal section on the line 4—4 of Figure 1;

Figure 5, a schematic view with portions of a clock mechanism and associated switch actuating levers shown in perspective and in operative relation to a motor circuit;

Figure 6, a fragmentary view of a peripheral wall portion of the carrier drum shown in Figure 1;

Figure 7, a fragmentary view partly in vertical section on the line 7—7 of Figure 1;

Figure 8, a fragmentary view of the lever and latch devices shown in Figure 2 and as repositioned to effect reverse or return movement of the carrier drum from one end position; and Figure 9, a fragmentary view of portions of the elements shown in Figure 3 and as repositioned during reverse or return movement of the carrier drum from one end position.

The drawings show one embodiment of my invention assembled to cooperate with the condenser operating or tuning mechanism of one form of radio receiving apparatus. As seen in Figure 1, a condenser, not shown, is actuated by a flexible shaft 1 forming an extension of shaft 2. A gear 3 on shaft 2 meshes with gear 4 on shaft 5. A uni-directional motor 7, through a suitable train of gears, drives the gear 8 on a shaft 9. Between shaft 9 and shaft 5 is located a suitable mechanical movement not shown but represented by the box 6, for controlling the direction and extent of rotation of shaft 5 and therefore of the condenser shaft in synchronized relation with movements of the selector devices hereinafter to be described. No description or showing of structural details of the direction controlling mechanical movement generally represented at 6 is given because they form no essential part of the invention herein disclosed and claimed. However, one form of mechanical movement for this purpose is disclosed and claimed in my co-pending application Serial No. 2,739 filed January 21, 1935.

For the purposes of this application, it is sufficient to indicate the instrumentalities which make up the illustrated embodiment of my invention and the means through which said instrumentalities may be made to control other apparatus such as the tuning devices hereinabove referred to. In the latter case, my improved control apparatus cooperates with a series of triggers or latch levers 10 pivoted on a common shaft 11. In normal operation, these levers are selectively rocked or deflected out of the position, as shown in full lines in Figure 7, to the position indicated in dotted lines by the tripping lugs or pins 12 adjustably mounted on a carrier as drum 13 in perforations 14 in the peripheral wall thereof. This rocking or tripping of selected ones of the triggers 10 may be employed to actuate various instrumentalities such for example as an elongated notched lever 6a mounted on a shaft 6b, Figs. 1 and 7, which in turn operatively connects with the mechanism represented by box 6, Fig. 1.

In the embodiment shown, the lower ends of triggers 10 extend into the paths of devices which control tuning operation of the condenser shaft 1; and the triggers are reset or deflected back to their original inoperative position by the same devices. These also form no essential part of the invention herein claimed and are mentioned only to illustrate more clearly one field of use in which applicant's improved control apparatus is employed to advantage.

In the embodiment as shown, therefore, the more immediate purpose of my invention is to provide means for automatically tripping selected or predetermined ones of the triggers or latch levers 10 in any desired sequence and during any cycle or time period. To selectively operate these devices automatically at intervals of fifteen minutes in a weekly cycle for example, the peripheral walls of carrier 13 are perforated or otherwise designed to accommodate the tripping lugs or pins 12. The carrier 13 may be in the form of a fourteen sided drum with an arrangement of perforations and markings, as shown in Figure 6. With nine triggers 10 in the series as seen in Figure 1, to be selectively tripped, each side or face of the drum representing a twelve hour period of elapsed time will provide facilities for nine positions of adjustment of one of the pins 12 in each vertical row of nine holes or perforations 14, Figure 6. To provide the four possible changes per hour usual in radio broadcasting, each drum face, representing twelve hours, has forty-eight rows of perforations.

It will be apparent that a pin or lug 12 may be positioned with one end in any one of the perforations 14 in each of the forty-eight circumferentially extending rows thereof; and when so positioned, will at the proper time, be brought into tripping position relatively to corresponding triggers 10. The drum 14 therefore is made to move longitudinally toward one end position at fifteen minute intervals and is automatically returned to its other end position and rotated at twelve hour intervals, preferably at noon and midnight, the cycle being completed in a week.

The intermittent or short step-by-step endwise movement of drum 14 at fifteen minute intervals is effected by driving mechanism cooperating with the rack 15 forming part of a carriage 16 between the end members of which drum 14 is mounted. A cylindrical bar 17 forms a bearing upon which the drum is free to slide longitudinally and to rotate at proper times. A pinion 18 meshing with rack 15 is mounted on a shaft 19 driven from motor 7 through a chain belt 20 and other transmitting devices hereinafter to be described. Maintenance of the proper operative relationship between pinion 18 and rack 15 and between pins 12 and triggers 10 is aided by a longitudinal guide flange 21 extending into notches 22 in the end members of carriage 16, or by other suitable device for preventing tilting or rocking of the carriage 16 around the bar 17.

As shown in Figures 1, 3 and 4, the chain 20 engages and drives a sprocket 23 on a shaft 24 mounted on an arm 25 pivoted to rock on a shaft 26. A small gear 27 on shaft 24 meshes continuously with a gear 28 on shaft 26; and a larger gear 29 is positioned to engage gear 30 on shaft 19 under conditions hereinafter to be described.

The shaft 26 also carries at one end cam devices, as an outer disc 31 and an inner disc 32, Figure 4. Outer disc 31 is provided with a cam projection having a curved edge portion 33 which engages one arm 34 of a pawl carrying lever. Another arm 35 of said lever supports a pawl 36 which engages a ratchet 37 on shaft 19, being biased in that position by a spring 38. A spring 39, biases the arm 34 of the pawl carrying lever to ride on the cam edge 33 of the cam projection.

Outer disc 31 also has a cam notch 40 in its peripheral edge adapted to receive the free end of a lever 41 provided with a detent 42, the depending edge of which extends into the V-shaped notches of a toothed wheel 43, also fixed to shaft 19. Lever 41 is biased in operative position by a spring 44. This arrangement provides a releasable lock which prevents rotation of shaft 19 except when positively driven for that purpose.

The inner disc 32 mounted on shaft 26 has a notch 45 in its peripheral cam edge. A cam follower in the form of a plunger 46 rides on said cam edge and actuates a switch 47 in a shunt circuit 48 of motor 7, Figure 5.

Motor 7 also has a main circuit 49 controlled by a switch 50 which is actuated periodically, i. e. every fifteen minutes for short interval operation, by a cam 51 having a notch 52 and connected with the minute hand mechanism of a clock, not shown, to make one revolution every fifteen minutes. A lever 55 pivoted at 53 and biased by a spring 54 to close switch 50 has one end engaging said switch and the other end riding on cam 51. When notch 52 encounters this end, lever 55 tilts to operate switch 50 to close circuit 49 of motor 7.

The chief function of the cam and switch devices just described is to accurately control the time at which motor 7 begins to operate. The duration of its period of operation is determined by the characteristics of the inner cam disc 32 and their effect on switch 47 which may thus be held closed for any desired interval after notch 52 has passed out of engagement with the adjacent end of lever 55. To effect the clearing and resetting of a condenser and all necessary repositioning movements of carriage 16 and carrier 13 will ordinarily require no more than several seconds. Hence, the inner cam disc 32 is preferably designed to hold switch 47 closed for the shortest period during which said resetting and repositioning operations can conveniently be effected. This includes both the step by step advance movement of the pin or lug carrier 13 every fifteen minutes and its return movement every twelve hours, conveniently referred to as its longer interval movement and which preferably follows close upon the last of the short interval advance movements of the carrier 13 in each twelve hour cycle.

The return or long interval movement of carrier 13 is also initiated by closing switch 50, Figure 5. For this purpose, a lever 56 pivoted on the shaft 53 is provided with cam following portions 57 and 58, the former engaging the cam edge of disc cam 59 and the latter engaging the cam edge of disc cam 60 mounted on a shaft 61 along with cam 51 previously referred to. Cam 60 has a notch 62 angularly offset in relation to notch 52 of cam 51. Cam 59 has notches 63 and 64 spaced 180° apart. Thus, if disc 59 is connected to the clock, not shown, to make one complete rotation each twenty four hours, notches 63 and 64 will be successively engaged by the follower 57 at twelve hour intervals. And when, at such twelve hour intervals, notch 62 also engages cam follower 58, the lever 56 normally biased by a spring 65 will move to close switch 50.

One function of cam 60 is to provide convenient means for more finely adjusting the time between the last short interval advance of carrier 13, as above described and as initiated by cam 51, and the return movement of said carrier at twelve hour intervals, as more roughly or approximately timed by the engagement of cam follower 57 in notches 63 and 64 respectively of cam 59. The operating period of the motor is however determined by cam 32 which controls the shunt circuit 48 as previously described and closes said circuit for the maximum time required.

I have also provided means for temporarily disengaging a portion of the step by step transmission above described and for throwing in a suitable reversing transmission. This is done in the illustrated embodiment by tripping instrumentalities actuated by or from the carrier 13 or by other associated means synchronized to operate with the last increment of advance movement of the carrier in each twelve hour period.

One form of reversing mechanism for returning the carrier includes the previously described arm 25, gear 29 and gear 30, and devices for disengaging pawl 36 from ratchet 37 to free shaft 19 for reverse rotation, and devices for swinging arm 25 to bring reversing gear 29 into mesh with gear 30, as shown in Figure 9. Arm 25 is normally biased toward the position shown in Figure 3 by a spring 66 but is deflected to reversing position by suitable means including a cam lug 67 on carriage 16 which, when carrier 13 reaches the end of its run in the direction of the arrow in Figure 2, rides on and over a pin 68 projecting laterally from a lever arm 69 pivoted at 70 and biased toward the position shown in Figure 2 by a spring 71. A stop pin 72 limits the extent of upward movement of lever 69, being positioned to allow the free end thereof to come behind a pin 73 extending laterally from a latch lever 74 pivoted at 75. A spring 76 having greater tension than spring 66, tends to swing latch lever 74 clockwise when the latter is disengaged from the free end of lever 69, as shown in Figure 8. Latch lever 74 also has a cam edge portion 77 engaging a pin 78 extending laterally from the upper portion of arm 25 through a curved slot 76' in wall 79 of the frame. A latch 80 having a detent 81, Figure 2, occupies a fixed relation to lever 69 and is biased by the same spring 71 to ride on pin 78 and to releasably hold said pin in its extreme right-hand position, Figure 8, when the pin is pressed thereto by clockwise turning of latch lever 74 induced by spring 76. Latch 80 also has a lug 82 at its free end which cooperates with the spring engaged end 85 of latch lever 74 as hereinafter described.

The rocking motion of arm 25 as it moves into the reversing position, as shown in Figure 9, also frees pawl 36 from ratchet 37 as a step precedent to meshing of gear 29 with gear 30. This is accomplished by means including an arm 86 pivoted on the pin 78 and having a cam edge portion 87 which rides on a fixed guide in the form of a stud 88 when arm 25 rocks on its axis. The cam edge 87 is so shaped that during reverse operation the free end of arm 86 bears outwardly against a pin 89 extending laterally from pawl 36 and across the path of movement of the free end of arm 86. When pin 78 and arm 25 are returned to the position shown in Figure 2, the arm 86 and pawl 36 resume the positions shown in Figure 3.

In operation, assuming the parts to be positioned as shown in Figures 2 and 3, pawl 36 is disengaged as above described and when the lug 67 is advanced to the position shown in Figure 8, it depresses the free end of lever 69 which slides out from locking engagement with pin 73. This permits latch lever 74 to rock clockwise against pin 78 to move said pin and therefore arm 25 into reversing position. Continuation of the same advancing movement of lug 67 also rocks latch lever 80 to the locking position shown in Figure 8 with detent 81 lying behind said pin 78 in its advanced position where it remains until the parts are reset by devices to be described. This period is approximately the time, conveniently several seconds, required to return carrier 13 to its operative position at the beginning of the next twelve hour cycle.

Toward the end of this return movement, the projecting end 83 of latch lever 74 is engaged by arm 84 on carriage 16 at the opposite end thereof from that which carries the lug 67. This rocks latch lever 74 backwards or counter-clockwise against spring 76. Meanwhile, reverse movement of carriage 16 has withdrawn lug 67 from its advanced position as in Figure 8, so that lever 69 is now free to swing counter-clockwise, which occurs when the spring engaged end 85 of latch lever 74 is moved upwardly against arm 82 of latch 80 to disengage detent 81 from locking engagement with pin 78.

In addition to the endwise movements of carriage 16 and carrier 13, the latter is also rotated a predetermined angular amount between successive twelve hour periods, preferably at the end of each return run of the carriage 16 as above described. For radio reception where the time unit is a week or seven days, the number of faces on the drum or carrier 13 will preferably be seven or some multiple thereof. The presently described embodiment employs fourteen faces each representing a twelve hour period or cycle.

As shown in Figure 1, a ratchet 90 and a locking disc 91 with notches 92 are fast on a hub 93 of carrier 13 journaled in the end member of carriage 16. A lever 94 has a detent 95 arranged to engage the notches 92 as they are successively presented thereto in normal operation of the device. Lever 94 is pivoted at 96 and carries a latch pawl 97 also pivoted at 96. A spring 98 biases said lever 94 toward its locking position, shown in Figure 1, from which it may be deflected either manually by lifting its free end 99 or automatically during operation of the apparatus and just prior to effecting the rotation of carrier 13 above referred to. Thus, an edge portion of the lower end 100 of lever 94 bears against a pin 101 extending laterally from a pawl arm 102 which carries a pawl 103 pivoted at 104 and arranged to engage the teeth of ratchet 90. A spring 105, cooperating with pin 101 and a fixed pin 106 biases pawl arm 102 against a stop 107 and in the position shown in Figure 1. A spring 108 maintains the free end of pawl 103 in engagement with ratchet 90. The lower end of pawl arm 102 carries a roller 109, Figure 2, positioned to engage the upper edge of a bar 110 pivoted at 111 and having a pin 112 extending laterally into a guide slot 113.

In operation, the last increment of return movement of carriage 16 brings roller 109 into engagement with the upper edge of bar 110. This deflects pawl arm 102 clockwise, Figure 1, whereupon pin 101 bears against arm 100 of lever 94 to disengage detent 95 from a notch 92. Continued movement of arm 102 as roller 109 is elevated along the upper edge of bar 110 retracts the head of pawl 103 into position to engage the next tooth of ratchet 90. Roller 109 now rides over and drops beyond the pivoted end of bar 110 whereupon pawl arm 102 is returned to its normal position, Figure 1, by the operation of spring 105. This also causes pawl 103 to thrust forward and thus advance the ratchet 90 a corresponding angular distance. Detent 95 automatically drops into locking position in a notch 92.

In a case where the step by step movement of carrier 13 trips triggers, as 10 in Figure 7, it will be helpful to provide for the unimpeded return movement of the carrier 13 and pins 12. Accordingly, each trigger 10 has a yielding detent 114 pivoted at 115 and held yieldingly in extended position by a spring 116. Thus when the pins 12 advance in the direction of the arrow, Figure 7, the selected triggers are deflected; and when the same pins return on reverse movement of carrier 13, the detents 114 yield to permit the pins to pass. Resetting of the triggers 10 is of course provided for by means not shown and which form no essential part of the invention herein described and claimed.

In addition to the automatic limited rotation of drum or carrier 13 effected periodically by the means hereinabove described, I also provide for its manual free rotation chiefly to permit placing or repositioning of the pins or lugs 12 in the perforations 14. Thus at practically any position of the carriage 16 along rack 15, the operator may lift the free end 99 of lock lever 94 to free drum 13 which may then be rotated clockwise, Figure 1, by hand to bring any desired faces of the drum into position to have the pins 14 set or re-set at will. Appropriate markings on the several faces of the drum will enable the operator to synchronize the drum movements with any desired program plan in broadcasting, or with any other analogous sequence of operating changes in cycles.

I claim—

1. Selector control mechanism comprising a carrier mounted to travel forward and back between end positions defining its limits of travel and for rotation, a driving motor, means for starting and stopping said motor, time controlled means for actuating said starting and stopping at predetermined relatively short intervals, time controlled means for actuating said starting and stopping at predetermined relatively longer intervals, means including a gear train for operatively connecting said carrier and said driving motor, reversing means cooperating with said gear train, means cooperating with said carrier to actuate said reversing means whereby said carrier is advanced toward one end position by a predetermined number of successive intermittent steps at relatively short intervals and returned by a single step toward its other end position at relatively longer intervals, means for releasably locking said carrier against rotation during movement between said end positions, and means for releasing said locking means and for rotating said carrier at one of said end positions.

2. Selector control mechanism comprising a carrier mounted to travel forward and back between end positions defining its limits of travel, a driving motor, means for starting and stopping said motor, time controlled means for actuating said starting and stopping means at predetermined relatively short intervals, time controlled means for actuating said starting and stopping means at relatively longer intervals, a pinion mounted to drive said carrier, a gear train operatively interposed between said motor and said pinion and including a reversing gear mounted to swing into and out of pinion actuating position and having operative connection with the motor, a pivoted arm carrying said reversing gear, and means actuated by the carrier for periodically moving said arm and said reversing gear into pinion driving position.

3. Selector control mechanism comprising a carrier mounted to travel forward and back between end positions defining its limits of travel, a driving motor, means for starting and stopping said motor, time controlled means for actuating said starting and stopping means at predetermined relatively short intervals, time controlled means for actuating said starting and stopping at relatively longer intervals, a pinion mounted to drive said carrier, a ratchet connected with said pinion, a pawl intermittently actuated to drive said pinion at said relatively short intervals, releasable means for holding said pawl in ratchet engaging position, a reversing gear mounted to swing into and out of pinion actuating position and having operative connection with the motor to drive the pinion in the opposite direction from that imparted by said pawl, a pivoted arm carrying said reversing gear, means actuated by the carrier for lifting the pawl and for swinging said arm into pinion reversing position at said relatively longer intervals.

4. Switch control apparatus for closing a switch periodically at long intervals and periodically at shorter intervals during said long intervals, comprising a switch member, separate levers arranged to actuate said switch member, a cam for imparting the longer interval periodic movement to one lever, a separate cam for imparting the shorter interval periodic movement to the other lever, and a third cam cooperating with said second mentioned cam and with said first mentioned lever to control the timing of the periodic movement thereof in relation to that of the second mentioned lever.

5. Selector control mechanism comprising a carrier mounted to travel forward and back between end positions defining its limits of travel, means for moving the carrier toward one end position, means for returning the carrier toward the other end position, and means for rotating said carrier including a ratchet mounted thereon, a pawl biased toward ratchet engaging and actuating position, a pivotally mounted pawl arm upon which said pawl is pivotally mounted at one end, said arm being biased to move the pawl into ratchet engaging and actuating position, and means for deflecting said arm against said bias during movement of the carrier in one direction sufficiently to effect a predetermined ratchet actuating movement of the pawl.

6. Transmission control mechanism comprising a shaft, a pinion mounted thereon, a motor provided with a driving shaft and having a primary circuit and a shunt circuit, a primary switch in the primary circuit, a secondary switch in the shunt circuit, time controlled means for closing the primary switch at predetermined relatively short intervals, time controlled means for closing the primary switch at relatively longer intervals, transmission means cooperating with said motor and said pinion shaft to drive the latter intermittently in one direction when the primary switch is closed at the short intervals including reversing means interposed between said driving shaft of the motor and said pinion shaft to drive the latter continuously in the opposite direction when the primary switch is closed at the longer intervals, means for releasably locking said pinion shaft against rotation when the motor is not operating, means actuated from a portion of said transmission means for moving said locking means out of locking position, and means for releasably holding said locking means out of locking position during operation of said reversing means.

7. Selector control mechanism comprising a carrier mounted to travel forward and back between end positions defining its limits of travel, a driving motor, a gear train operatively interposed between said carrier and said driving motor and including a reversing gear adjustably mounted to be moved between a carrier advancing position and a carrier returning position, means for starting and stopping said motor, time controlled means for actuating said starting and stopping means at relatively short intervals during which the carrier is moved by said gear train in one direction and at relatively longer intervals during which the carrier is moved by said gear train in the opposite direction, and means actuated from said carrier to engage said reversing gear and vary the operative position thereof in relation to said gear train, whereby, in one position of said gear, said carrier is repeatedly advanced in one direction of its travel when said starting and stopping means is actuated at said relatively short intervals and, in another position of said gear, the carrier is returned by a single step in the opposite direction when said starting and stopping means is actuated at said relatively longer intervals.

8. Selector control mechanism comprising a carrier mounted to travel forward and back between end positions defining its limits of travel, a rack on said carrier, a driving motor, starting and stopping means for said motor, time controlled means for actuating said starting and stopping means at predetermined relatively short intervals and for actuating said starting and stopping means at predetermined relatively longer intervals, a gear train operatively interposed between said carrier and said driving motor and including a pinion meshing with said rack, a reversing gear in said train, and means on said carrier to move said reversing gear from one position in said train to another in a cycle wherein said pinion is actuated intermittently in one direction at a predetermined number of intervals and then in the opposite direction.

9. Selector control mechanism comprising a carrier mounted to travel forward and back between end positions defining its limits of travel, a driving motor, means for starting and stopping said motor, time controlled means for actuating said starting and stopping means at relatively short intervals and for actuating said starting and stopping means at relatively longer intervals, means operative between the motor and the carrier and including a gear train having a pawl and ratchet to actuate said carrier in one direction at the relatively short intervals and a different portion to actuate the carrier in the opposite direction at the relatively longer intervals, and means actuated by said carrier for disengaging said pawl from said ratchet to maintain the short interval portion of the gear train inoperative while the longer interval portion is in operation.

10. Selector control mechanism comprising a carrier mounted to travel forward and back between end positions defining its limits of travel, a driving motor, starting and stopping means for said motor, time controlled means for actuating said starting and stopping means at relatively short intervals and for actuating said starting and stopping means at relatively longer intervals, a gear train operatively interposed between said motor and said carrier and including a ratchet connected with said carrier, a pawl arm operatively connected to the motor, and a pawl mounted on said arm and engaging said ratchet at said relatively short intervals, releasable means for holding said pawl arm and said pawl in ratchet engaging position, means for lifting the pawl arm to disengage said pawl and hold it out of ratchet engaging position, and means on the carrier for actuating said pawl holding and pawl lifting means.

11. Selector control mechanism comprising a carriage mounted to travel forward and back between end positions defining its limits of travel, a rotatable member on the carriage, means for moving the carriage intermittently in one direction, means for returning the carriage in the opposite direction, a latch operatively arranged between the carriage and the said member for locking the drum against rotation during forward and back travel of the carriage, means actuated by the carriage for engaging and releasing said latch during travel of the carriage, and means connected with said latch releasing means for rotating said rotatable member.

HAROLD J. KAYE.

CERTIFICATE OF CORRECTION.

Patent No. 2,180,740. November 21, 1939.

HAROLD J. KAYE.

It is hereby certified that error appears in the printed specification of the above numbered patent requiring correction as follows: Page 5, second column, lines 38 and 39, for the words "said member for locking the drum" read rotatable member for locking said member; and that the said Letters Patent should be read with this correction therein that the same may conform to the record of the case in the Patent Office.

Signed and sealed this 2nd day of January, A. D. 1940.

(Seal)

Henry Van Arsdale,
Acting Commissioner of Patents.